Dec. 5, 1961   J. H. RAYMOND   3,011,411
CODE KEY CUTTING MACHINE
Filed Sept. 17, 1959   5 Sheets-Sheet 1

INVENTOR
Joseph H. Raymond

BY Mason, Fenwick & Lawrence
ATTORNEYS

Dec. 5, 1961  J. H. RAYMOND  3,011,411
CODE KEY CUTTING MACHINE
Filed Sept. 17, 1959  5 Sheets-Sheet 2

INVENTOR
Joseph H. Raymond
BY Mason, Fenwick & Lawrence
ATTORNEYS

Dec. 5, 1961 J. H. RAYMOND 3,011,411
CODE KEY CUTTING MACHINE
Filed Sept. 17, 1959 5 Sheets-Sheet 3
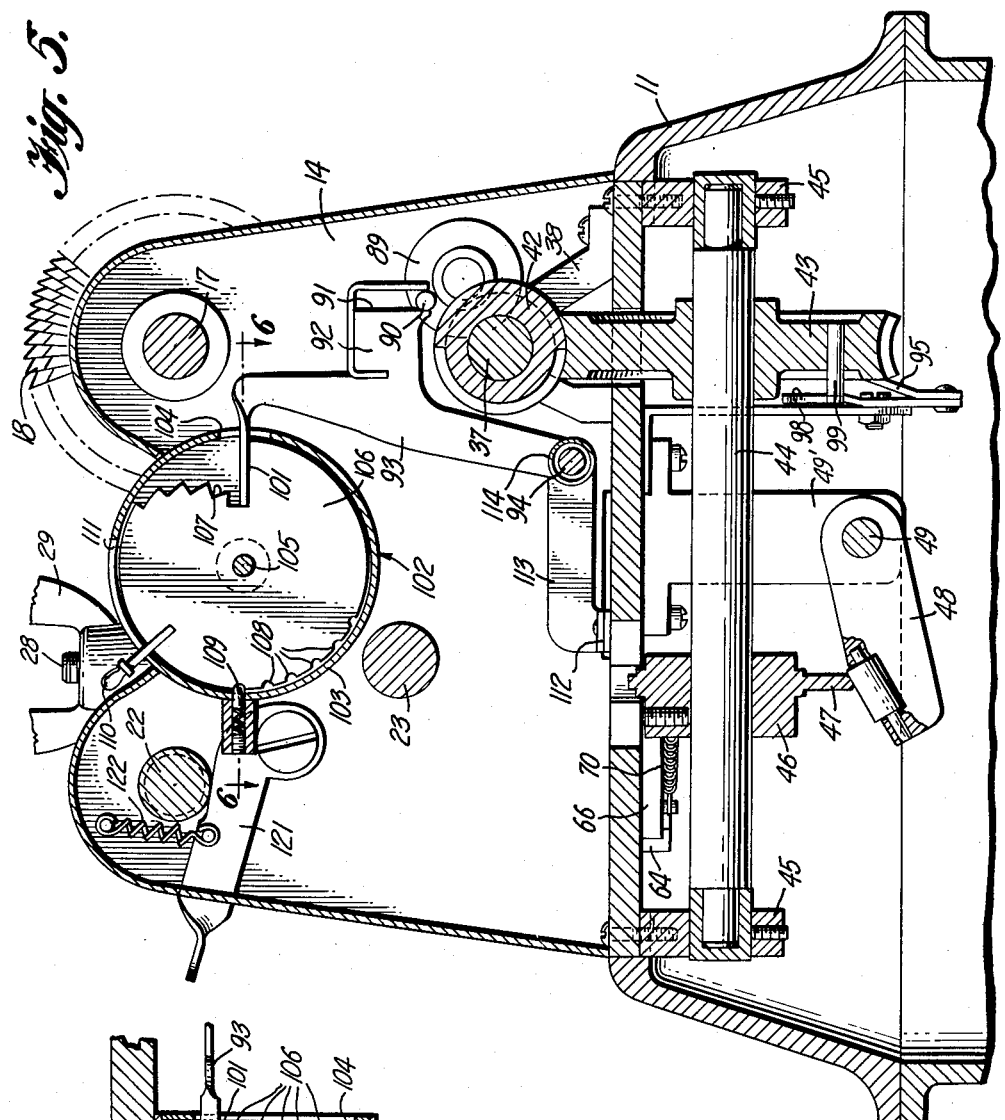
INVENTOR
Joseph H. Raymond
BY Mason, Fenwick & Lawrence
ATTORNEYS Dec. 5, 1961   J. H. RAYMOND   3,011,411
CODE KEY CUTTING MACHINE
Filed Sept. 17, 1959   5 Sheets—Sheet 4

INVENTOR
Joseph H. Raymond
BY Mason, Fenwick & Lawrence
ATTORNEYS

Dec. 5, 1961        J. H. RAYMOND        3,011,411
CODE KEY CUTTING MACHINE
Filed Sept. 17, 1959        5 Sheets-Sheet 5

INVENTOR
Joseph H. Raymond
BY
Mason, Fenwick & Lawrence
ATTORNEYS

United States Patent Office 3,011,411
Patented Dec. 5, 1961

3,011,411
CODE KEY CUTTING MACHINE
Joseph H. Raymond, 3653 N. Overhill Ave., Chicago, Ill.
Filed Sept. 17, 1959, Ser. No. 840,631
9 Claims. (Cl. 90—13.05)

The present invention relates in general to key cutting machines, and more particularly to machines for automatically cutting an entire key bit from code data set into the machine prior to cutting of the key.

An object of the present invention is the provision of a novel code key cutting machine so arranged that a key may be easily and accurately cut in accordance with code data regarding the depth and spacing of the tumbler notches.

Another object of the present invention is the provision of a novel code key cutting machine having means for setting up a code therein for regulating the depth of cut of tumbler notches in the bit of the key and for regulating the spacing between tumbler notches longitudinally of the key bit, and wherein the entire cutting of the key bit surface in accordance with the code settings is automatically effected upon initiation of the cutting procedure.

Another object of the present invention is the provision of a novel code key cutting machine which is extremely versatile so as to facilitate cutting of keys for a wide variety of makes of locks having different tumbler notch depth and spacing characteristics.

Another object of the present invention is the provision of a novel code key cutting machine having a drum mechanism thereon wherein code depth settings may be established for each of the tumbler notch positions along the length of the key bit to automatically control the depth of cut of the tumbler notches at the appropriate position.

Other objects, advantages and capabilities of the present invention will become apparent from the following detail description, taken in conjunction with the accompanying drawings illustrating one preferred embodiment of the invention.

In the drawings:

FIGURE 5 is a vertical transverse section view of the code key cutting machine, taken along the line 5—5 of FIGURE 2;

FIGURE 6 is a fragmentary horizontal section view of the code drum unit, taken along the line 6—6 of FIGURE 5;

Figure 1:
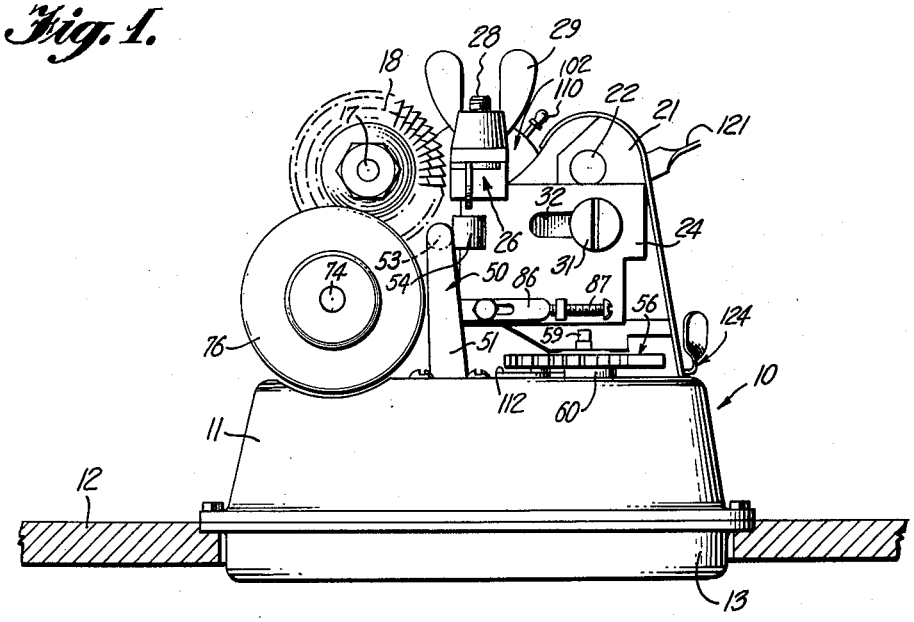
FIGURE 1 is an end elevation of a code key cutting machine embodying the present invention.
Figure 2:
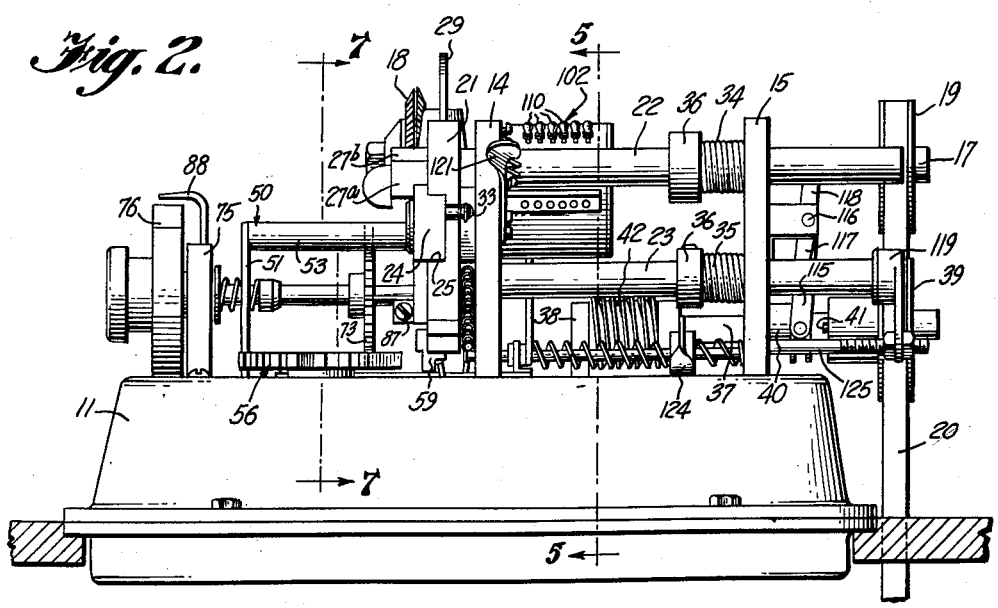
FIGURE 2 is a side elevation of the code key cutting machine.

Referring to the drawings wherein like reference characters designate corresponding parts throughout the several figures, the code key cutting machine, generally indicated by the reference character 10 comprises a rectangular base 11 which may be flanged at its bottom as illustrated in FIGURES 1 and 2 and adapted to be supported on a suitable table or other conventional supporting surface, as indicated at 12, and which may if desired have a bottom closure plate 13. A pair of longitudinally spaced, transversely extending, vertical support plates 14, 15 extend from the upper surface of the base 11 and contain a pair of aligned bearings 16 near one lateral edge thereof for supporting a cutter shaft 17 having a rotary cutting wheel 18 of the usual beveled-faced type used in key cutting keyed or otherwise fixed to one end thereof. The opposite end of the cutter shaft 17 has a pulley 19 keyed or otherwise fixed thereto adapted to receive a belt 20 extending from the drive pulley of an electric motor or other suitable power source (not shown).

Movable longitudinally of the base 11 is a carriage 21 fixed to the ends of a pair of carriage guide rods 22 and 23 which extend through accommodating apertures in the support plates 14, 15 and slidably support the carriage 21 for rectilinear longitudinal reciprocative movement relative to the base 11. The carriage 21 slidably supports a key supporting block 24 for rectilinear reciprocative movement transversely of the carriage 21 and of the base 11, the carriage 21 having a slideway or groove 25 therein which receives a complementary projection from the key supporting block 24.

A key vise 26, including a stationary clamping block 27a and a removable clamping plate 27b is supported on the key supporting block 24 and includes a screw 28 which extends upwardly from the block 27a and through the removable plate 27b, and a threaded wing nut 29 threaded onto the screw 28 and downward beyond the removable key clamping plate 27b to clamp a key blank, as indicated at 30, in position to be moved relative to and be cut by the rotary cutting wheel 18. A large headed bolt 31 fixed in the carriage 21 and extending through a slot 32 in the key supporting block 24 cooperates with the projection on the block 24 which extends into the groove 25 to support the key supporting block 24 for transverse sliding movement and retain the block 24 on the carriage 21. A coil spring 33 anchored at one end of the carriage 21 and at the other end to the key supporting block 24 continuously biases the key supporting block 24 toward the rotary cutting wheel 18. Additional coil springs 34 and 35 extend between collars 36 adjustably keyed to the carriage guide rods 22, 23 and the support plate 15 to continuously bias the carriage 21 toward the left-hand end of the base 11 as viewed in FIGURE 3.

The mechanism for automatically regulating the advancement of the carriage 21 longitudinally of the base 11 and the movement of the key supporting block 24 transversely of the base, and for cycling the remaining components of the automatic control mechanism includes a driven shaft 37 journalled in the support plate 15 and in a bearing bracket 38. The pulley 39 is loosely journalled on the driven shaft 37 and is disposed substantially in alignment with the pulley 19 and adapted to also be driven by the drive belt 20. The pulley 39 is selectively intercoupled with the driven shaft 37 by means of an axially shiftable clutch member 40 of conventional construction which is coupled to the driven shaft 37 by a slidable connection such as a pin and slot connection to permit axial movement of the clutch member 40 but to prevent relative rotation between the shaft 37 and clutch member 40, and has a suitable pin or the like projectable into the path of a pin 41 on the pulley 39 at one axial position of the clutch member 40 to provide a driving connection between these members.

The inner end of the driven shaft 37 has a worm 42 fixed thereto which is intercoupled with a worm gear 43 projecting through an aperture in the base 11 and keyed to a transverse cam shaft 44 journalled in bearing brackets 45 depending from the base 11. There is keyed to the cam shaft 44 a cam 46 having a projection 47 thereon which is adapted to engage a cam follower lever 48 having a roller riding on the periphery of the cam 46. The cam follower lever 48 is keyed at its inner end to a rocker shaft 49 extending longitudinally of the base 11 and journalled in depending bearing brackets 49'. Likewise fixed to the rocker shaft 49 and spaced from the cam follower lever 48 is a yoke member 50 for shifting the key supporting block 24 transversely of the base 11 against the biasing action of the spring 33. The yoke member 50 has a pair of arms 51, 52 and a roller 53 spanning the arms 51, 52 at the upper ends thereof to bear against a roller 54 at the adjacent edge of the key supporting block 24. A spring 55 secured at one end to the arm 51 of the yoke 50 and at the other end to the base 11 continuously biases the roller 53 to the left as viewed in FIGURES 1 and 7 and therefore biases the cam follower lever 48 toward the periphery of the cam 46.

Figure 7:
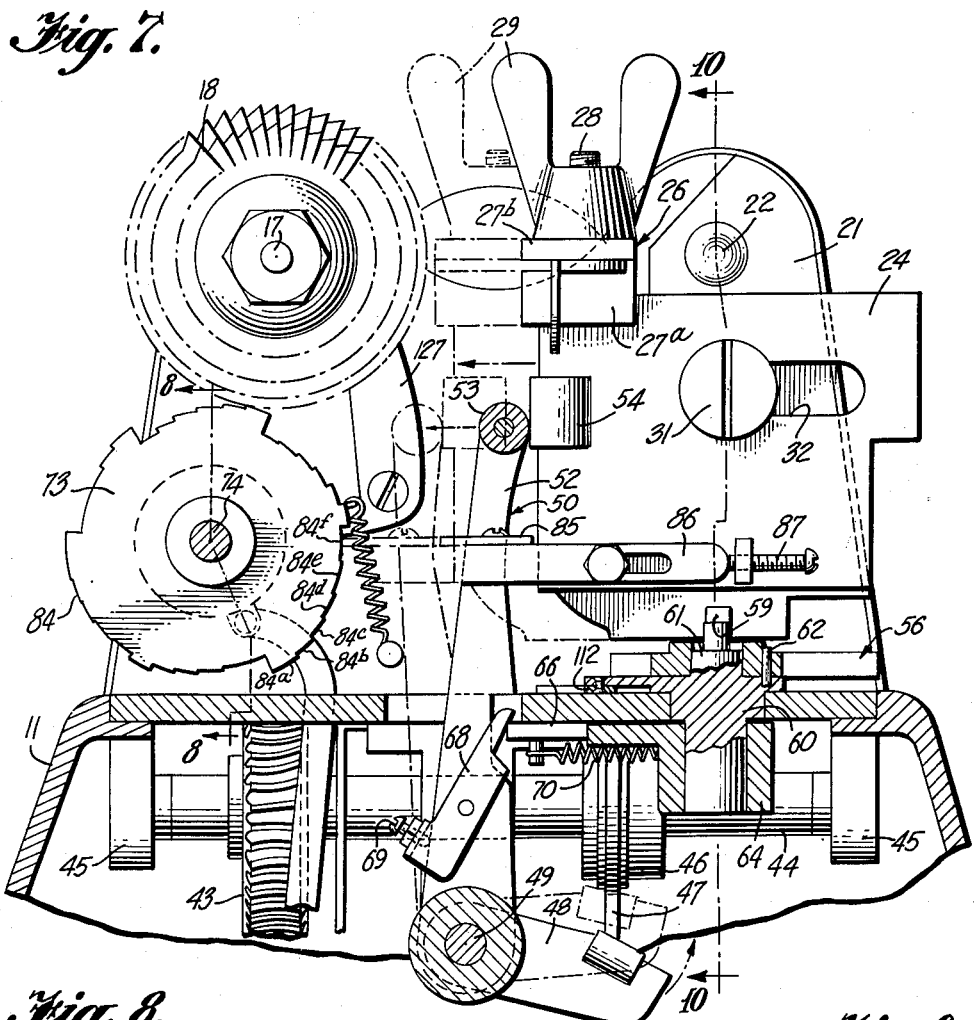
FIGURE 7 is a vertical transverse section view taken along the line 7—7 of FIGURE 2.

It will be apparent that each time the projection 47 on the cam 46 engages the cam follower lever 48 and rotates the same downwardly from the dotted line position to the solid line position as illustrated in FIGURE 7, the yoke member 50 will be shifted in a clockwise direction from the dotted line position to the solid line position to slide the key supporting block 24 to the right as viewed in FIGURE 7, and withdraw the key blank 30 in the key vise 26 away from the rotary cutting wheel 18, and that the key blank will be held away from the cutting wheel 18 over the period that the periphery of the cam projection 47 engages the roller of the cam follower lever 48.

In order to establish proper spacing of the notches to be cut in the edge of the key blank 30 along the longitudinal axis of the key blank, means are provided for governing the stepping of the carriage 21 through precisely spaced increments of movement longitudinally of the base 11. This means includes a spacer wheel 56 having a plurality of radially extending lobes similar to the spacing lobe 57 whose periphery is provided with a plurality of stepped stop surfaces 58 spaced radially and angularly relative to the axis of the spacer wheel 56 to present stop surfaces which are spaced longitudinally of the base 11 to a shoulder member 59 which depends from and is fixed to the carriage 21. The spacer wheel 56 is removably and angularly adjustably supported on a rotatable hub 60 journalled in the base 11 having a central projection 61 adapted to fit into a central opening in the spacer wheel 56 and an eccentric pin 62 which fits into one of the eccentric openings 63 in the spacer wheel 56 to present a selected one of the lobes of spacer wheel 56 to the shoulder member 59 on the carriage 21. Disposed below the base 11 and fixed to the hub 60 is a ratchet sector 64 which is resiliently biased by spring 65 in a clockwise direction as viewed in FIGURE 4 and which is adapted to be cyclically stepped in selected angular increments by a slidable pawl 66 supported by a pin and slot connection 67 on the base 11 to rotate the spacer wheel 56 in such a way as to sicessively present radially inwardly spaced stopped surfaces 58 to the shoulder member 59. The tail of the pawl 66 is disposed in the path of an adjustable accommodating member 68 pivoted on the arm 52 of the yoke member 50 and adjustable thereon to vary the throw of the pawl 66 by means of an adjustable screw 69.

Figure 3:
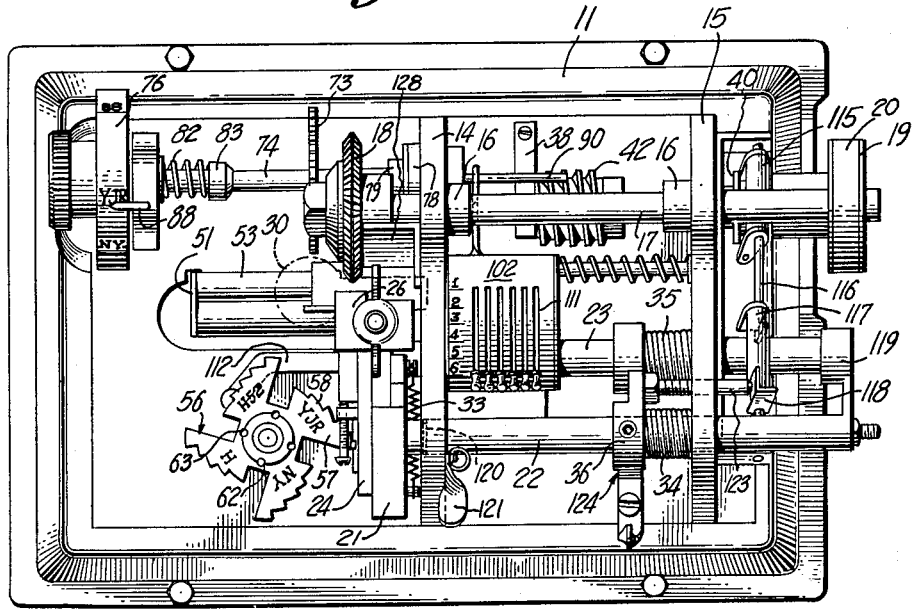
FIGURE 3 is a top plan view of the code key cutting machine.
Figure 4:
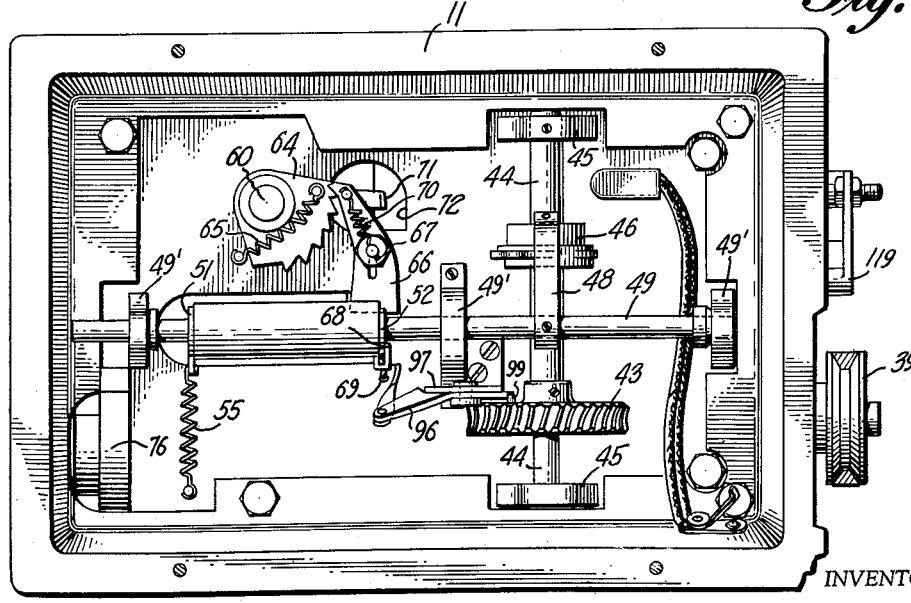
FIGURE 4 is a bottom plan view of the code key cutting machine.

It will be seen that upon each stroke of the yoke member 50 to withdraw the key supporting block 24 from the cutting wheel 18, the actuating member 68 on the yoke arm 52 will engage the tail of the pawl 66 and advance the pawl upwardly as viewed in FIGURE 4 to rotate the ratchet sector 64 in a counterclockwise direction and shift the next inwardly spaced stop surface 58 of the spacer wheel lobe 57 into confronting relation to the shoulder member 59 on the carriage 21, whereupon the carriage 21 will be shifted to the left as viewed in FIGURE 3 by the springs 34, 35 to the extent permitted by the stop surface presented to the shoulder member 59. The engagement of the shoulder member 59 with the shoulder interconnecting the newly contacted stop surface and the previously contacted stop surface prevents return rotation of the ratchet sector 64 in a clockwise direction as viewed in FIGURE 4 during return of the pawl 66 under action of its spring 70 when the yoke 50 returns toward the cutting wheel 18 to the dotted line position of FIGURE 7.

A tripping lug 71 is mounted on the pawl 66 adjacent the pointed tip of the pawl and extends upwardly through the opening 72 in the base 11 into the path of return movement of the shoulder member 59 to an innermost limit position relative to the support plate 14 to withdraw the tip of the pawl 66 from the ratchet sector 64 when the carriage 21 approaches this innermost limit position and free the ratchet sector 64, hub 60 and spacer wheel 56 to be returned by the spring 65 to a starting position wherein the radially outermost stop surface 58 is presented to the shoulder member 59.

While the spacer wheel 56 illustrated in FIGURE 3 of the drawings is shown as a four-lobe spacer wheel, it is apparent that a spacer wheel having a different number of lobes may be provided. The purpose of providing different lobes on the spacer wheel 56 is to adapt a single spacer wheel to properly govern the spacing of the longitudinal increments of movement of the carriage 21 in accordance with the longitudinal spacing of the notches to be cut in the key blank for several different manufacturers' specifications. By providing a plurality of lobes 57 to a single spacer wheel 56 will be capable of properly governing longitudinal stepping movement of the carriage 21 for a number of different combinations of notch spacings corresponding to the number of lobes provided. The openings 63 in the spacer wheel 56 should correspond in number to the number of lobes 57 and serve to properly orient a selected one of the lobes 57 relative to the shoulder member 59 on the carriage 21.

An additional assembly is provided for regulating the depth of cut of the notches in the key blank 30 in accordance with selected numerical code settings and for a variety of types of key locks wherein the depth of the notches for the various code numbers may vary somewhat with different types. This is accomplished by providing a master depth wheel 73 which is keyed to a horizontal shaft 74 journalled near its outer end in stanchion 75 and having a calibrated dial 76 fixed to the outer end of the shaft 74. The inner end of the shaft 74 slidably fits into an opening 77 in a female clutch member 78 rotatably supported in the support plate 14, the shaft 74 having keyed thereto a male clutch member 79 having a pin 80 adapted to be selectively projected into one of a plurality of sockets 81 in the adjacent face of the female clutch member 78. A coil spring 82 surrounds a portion of the shaft 74 and extends between the collar 83 on the shaft 74 and the stanchion 75 to continuously bias the shaft 74 and the male clutch member 79 toward the female clutch member 78.

The master depth wheel 73 has a plurality of stepped zones along the periphery thereof each having radially and angularly spaced stop surfaces 84 forming a series of stop surfaces spaced at selected increments progressing inwardly toward the axis of the depth wheel 73, which are adapted to be presented to a limit plate 85 carried on a support 86 which is adjustably supported on the key supporting block 24. An adjustment screw 87 is provided to permit a fine adjustment of the position of the limit plate 85 relative to the key supporting block 24 to be made. It will be seen that presentation of one of the stop surfaces 84 on the depth wheel 73 to the limit plate 85 will govern the extent of travel of the key supporting block 24 toward the cutter wheel 18 and thereby regulate the depth of the cut made by the cutter wheel 18 in the key blank 30 carried by the key vise 26.

Figure 8:
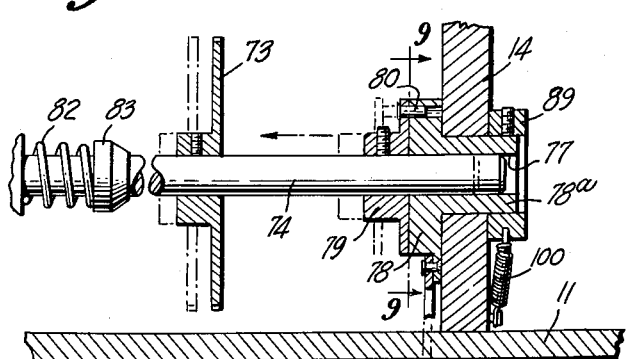
FIGURE 8 is a vertical fragmentary section view of the depth gaging wheel and associated shaft and clutch mechanism taken along the line 8—8 of FIGURE 7.

The depth wheel 73 in the specific embodiment herein illustrated and described contains six of such stepped zones, to correspond to the different sets of notch depth specifications for six different makes or types of key locks. The depths of cut comprising the range of depths for each make or type of lock are identified by code numbers 1, 2, 3, 4, 5 and 6. The stop surfaces 84a, 84b, 84c, 84d, 84e, and 84f for each stepped zone of the wheel 73 establish the depth of cut produced by the machine for each of the code numbers 1 to 6, respectively, the surfaces 84a to 84f being spaced radially of the axis of the master depth wheel 73 to establish limits of travel of the key supporting block 24 appropriate to produce the depths of cut determined by data afforded by the lock manufacturers. The periphery of the dial 76 is provided with indicia identifying a particular lock manufacturer and lock type, to facilitate orientation of the dial 76 in relation to a fixed pointer 88 to present a selected stepped zone on the depth wheel 73 to the limit plate 85. This is accomplished by shifting the dial 76 and shaft 74 axially to the left as viewed in FIGURES 2, 3 and 8 to decouple the clutch members 79 and 78 and then rotating the dial 76 to bring selected indicia markings into registration with the pointer 88. Upon release of the dial 76, the spring 82 biases the shaft 74 in a direction to again couple the clutch members 79 and 78.

Figure 9:
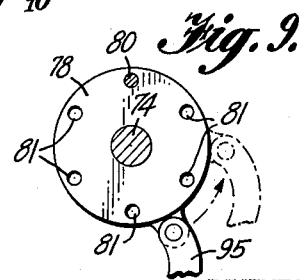
FIGURE 9 is a fragmentary section view of the clutch mechanism associated with the depth gaging wheel, taken along the line 9—9 of FIGURE 8.
Figure 10:
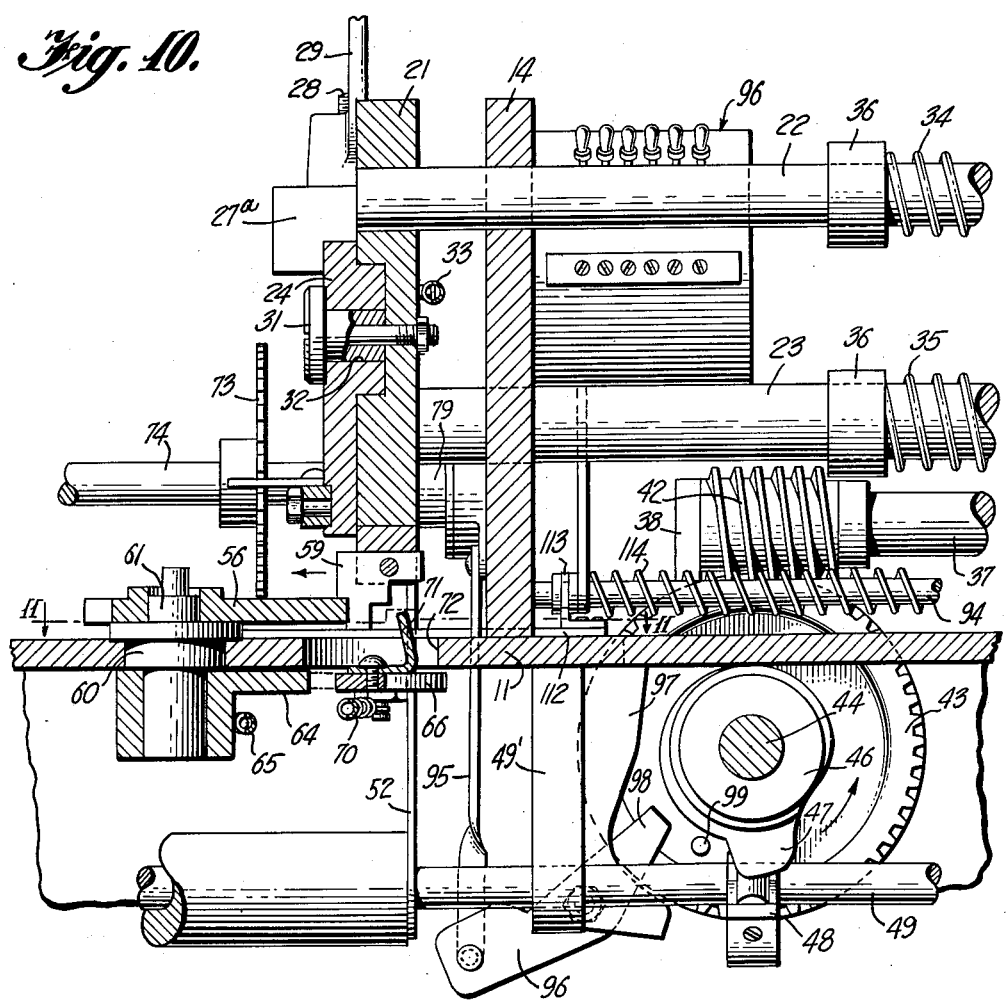
FIGURE 10 is an enlarged fragmentary longitudinal section view, taken along the line 10—10 of FIGURE 7.

A collar 89 is fixed to the extension 78a of the female clutch member 78 projecting through support plate 14 and carries an eccentric pin 90 which fits into a slideway 91 formed in an extension 92 of a coding lever 93. The coding lever 93 is pivoted at its lower end on an elongated shaft 94 extending longitudinally of the base 11 between the support plates 14, 15 and is slidably supported in the shaft 94 for movement through a preselected range axially along the shaft 94. The shaft 74, clutch members 78, 79, collar 89 and eccentric pin 90 are adapted to be oscillated through a limited arc by means of a link 95, shown particularly in FIGURES 8, 9 and 10, which is pivoted at its upper end to an eccentric extension of the female clutch member 78 and at its lower end to the outer end of a lever 96 pivoted on a post 97 depending from the base 11. The pivoted lever 96 has an inner end portion 98 disposed in the path of movement of a pin 99 on the worm gear 43. As the worm gear 43 rotates in the direction of the arrow shown in FIGURE 10, the pin 99 contacts the end 98 of the lever 96 during each revolution of the gear 43, shifting the lever 96 in a clockwise direction about its pivot and elevating the link 95 to rotate the clutch member 78, collar 89 and eccentric pin 90, and thereby rotate the master depth wheel 73 in a counterclockwise direction from the position illustrated in FIGURE 7. A spring 100 secured at one end to a point on the periphery of the collar 89 and at its other end to the support plate 14 returns the collar 89 and interconnected components to their original position and shifts the lever 96 to its original position upon passage of the pin 99 out of contact with the lever 96.

This oscillation of the collar 89 and its eccentric pin 90 also oscillates the coding lever 93 through a limited arc about the axis of the shaft 94 of sufficient extent to withdraw the end of the nose 101 fully from the code selector drum 102 and return the nose 101 toward the position illustrated in FIGURE 5. The code selector drum 102 is arranged to permit the selection of the various depths to which the notches at six longitudinally spaced positions along the key bit are to be cut in accordance with a numerical code supplied by the manufacturer and to permit this selection to be made prior to initiation of the key cutting procedure to control the entire key cutting for a single key. To this end, the code selector drum comprises a cylindrical housing 103 fixed to the support plate 14 with the axis of the housing disposed horizontally, the housing 103 having an access opening 104 extending longitudinally thereof parallel with the axis of the housing in a position to admit the coding lever nose 101 into the housing. A spindle 105 is disposed centrally within the housing 103 and supports six axially spaced depth selector disks 106 for rotation within the housing 103. The depth selector disks are each of identical construction and include a series of stepped gaging surfaces 107 which are spaced angularly from each other and are at progressively decreasing radial distances from the center of the disk relative to the outer periphery of the disk. Disposed generally opposite the gaging surfaces 107 are a series of six notches 108 adapted to coact with a spring urged detent 109, and a setting tab 110 projects through an arcuate slot 111 in the housing 103. The notches 108 and detent 109 are to resiliently retain the associated selector disk 106 at different angular positions of adjustment of the setting tabs 110 which determine which one of the gaging surfaces 107 is presented to the nose 101 of the coding lever 93. A series of code numbers from one to six and associated index markings are provided on the external surface of the housing 103 to indicate the angular positions to be assumed by the setting tabs 110 to present selected ones of the gaging surfaces 107 to the coding lever nose 101.

Figure 11:
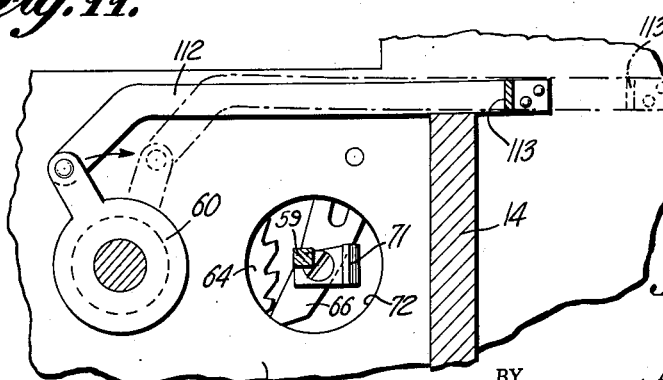
FIGURE 11 is a fragmentary section view taken along the line 11—11 of FIGURE 10 and illustrating details of the longitudinal key stepping mechanism.

The coding lever 93 is adapted to be stepped axially along the shaft 94 from a position engaging the selector disk 106 nearest the support plate 14 to positions engaging the next successive selector disks 106 progressing away from the plate 14. This is accomplished in timed relation with the shifting of the yoke 50 to the right as viewed in FIGURE 7 so that the stepping of the coding lever 93 occurs when the limit plate 85 and key blank 30 are spaced away from the depth wheel 73 and cutting wheel 18. This is achieved by providing a rectilinearly shiftable elongated link 112 which is pivotally coupled at one end to an extension of the hub 60, as illustrated in detail in FIGURE 11, and which at the other end carries a rigid extension 113 which surrounds the shaft 94 and bears on the side of the coding lever 93 adjacent the support plate 14. A coil spring 114 on the shaft 94 extends between the coding lever 93 and the support plate 15 to continuously urge the coding lever 93 to the selector disk position nearest the support plate 14. It will be appreciated that upon angular stepping of the ratchet sector 64 and hub 60 by the pawl 66 in response to approach of the yoke 50 to its right-hand limit position as viewed in FIGURE 7, whereupon the spacer wheel 56 is shifted to present the next inwardly spaced stop surface 58 to the shoulder member 59, the link 112 and its rigid extension 113 will be likewise shifted to the right as viewed in FIGURE 11 to move the coding lever 93 axially along the shaft 94 to the next selector disk position.

A control yoke 115 for the clutch member 40 associated with the pulley 39 is keyed to a transverse shaft 116 supported on the support plate 15, and the shaft 116 is provided with a pair of rigid stop arms 117 and 118 which extend in opposite directions from the shaft. The stop arm 117 is positioned in the path of a fixed collar 119 on the end of the carriage guide rod 23 to be engaged by the collar 119 when the carriage 21 reaches its end-of-travel position wherein the shoulder member 59 abuts the radially innermost stop shoulder 58 of the spacer wheel 56 and produce sufficient rotation of the shaft 116 to disengage the clutch member 40 from the pulley 39 and terminate driving of the shaft 37. The carriage guide rod 22 is provided with an annular groove 120 positioned to lie immediately to the right of the support plate 14 when the carriage 21 is at a start position wherein it is disposed somewhat farther to the right than the position shown in FIGURE 3. The groove 120 is positioned to receive a lock lever 121, shown best in FIGURE 5, which is pivoted to the support plate 14 and is resiliently biased in a clockwise direction by spring 122 to cause the upper edge of the lock lever 121 to interfit into the groove 120 and restrain the carriage 21 in the start position. The stop arm 118 is disposed in the path of movement of pin 123 extending from the collar 36 on the carriage guide rod 22 to be tripped by the pin 123 when the carriage 21 reaches the start position and shift the yoke 115 to disengage the clutch member 40 from the pulley 39.

If desired, an electrical switch 124 may be provided on the base 11 to control an electric motor for driving the pulleys 19 and 39, which may be controlled by a pivoted finger piece to shift the switch to "on" position and which may be located in the path of movement of a pin 125 projecting from a rigid extension of the collar 119 and so spaced between the support plates 14, 15 as to be engaged and tripped to "off" position when carriage 21 reaches its end-of-travel position.

In describing the operation of the apparatus, it will be assumed that the appropriate lobe 57 of the spacer wheel 56 for the particular lock manufacture and type for which the key is to be cut has been selected and positioned toward the shoulder member 59 and that the dial 76 has been appropriately adjusted in relation to the pointer 88 to dispose the proper stepped zone of the master depth wheel 73 toward the limit plate 85. At the start position of the apparatus, the carriage 21 will be held withdrawn to its right-hand limit of movement by the lock lever 121 and the yoke 50 will hold the key supporting block 24 sufficiently to the right as viewed in FIGURE 7. The key blank 30 is then inserted between the clamping block 27a and plate 27b of the key vise 26 and appropriately located longitudinally of the apparatus by gaging means which, in this embodiment, comprises a gaging lever 127 pivoted on the support plate 14 and having a flanged portion 128 which is adapted to be shifted against the adjacent edge of the bit of the key blank 30 so that the left-hand edge of the flange 128 as viewed in FIGURE 3, forms a guide edge against which the shoulder of the key blank 30 is to be abutted.

The key blank 30 is then locked in the key vise 26 by means of the wing nut 29, the electric switch 124 is actuated to energize the electric motor, and the lock lever 121 is tripped downwardly to release the carriage 21 and permit the springs 34, 35 to shift the carriage 21 to the left as viewed in FIGURE 3 until the shoulder member 59 abuts the outermost stop surface 58 of the adjacent spacer wheel lobe 57. This withdraws the pin 123 from contact with the stop arm 118 and permits the yoke 115 on the spring biased shaft 116 to intercouple the clutch member 40 with the pulley 39 and effect driving of the shaft 37 and worm 42. This rotates the worm gear 43 in a counterclockwise direction as viewed in FIGURE 10, which correspondingly rotates the shaft 44 and cam 46 whereupon the cam projection 47 will be driven out from under the cam follower lever 48, causing the cam follower lever 48 to rotate upwardly to the dotted line position of FIGURE 7 and shift the yoke 50 toward the left to its dotted line position, which permits the key supporting block 24 to shift to the left and bring the key blank into contact with the cutter wheel 18. The deph of cut made by the cutter wheel 18 will be determined by the particular one of the stop surfaces 84a–84f of the master depth wheel 73 which is in the path of the limit plate 85. This in turn determined by the position of the setting tab 110 of the selector disk 106 nearest the support plate 14. It will be apparent that the rotation of the worm gear 43 which caused the cam projection 47 to pass out of contact with the cam follower lever 48 also moved the pin 99 beyond the lever 96, causing the lever 96 to be rocked in a counterclockwise direction to the position shown in FIGURE 10. The passage of the pin 99 beyond the lever tip 98 actually occurs prior to the passage of the projection 47 out of contact with the lever 48, as will be apparent from FIGURE 10. This in turn lowered the link 95 and rotated the clutch members 78, 79, collar 89, eccentric pin 90 and master depth wheel 73 through a limited arc to the positions shown in FIGURES 5 and 7, which caused the coding lever 93 to be rocked through a sufficient arc to insert the nose 101 into the selector drum housing 103 to engage the particular gaging surface 107 presented to it by adjustment of the setting tab 110. Assuming that the setting tab 110 for the first selector disk 106 was set in the number six code position, as illustrated in FIGURE 5, this would permit the maximum extent of projection of the coding lever 93 into the housing 103 and therefore the maximum extent of clockwise rotation of the shaft 74 and depth wheel 73, as viewed in FIGURE 7, under the action of the spring 100, and will dispose the deepest stop surface 84f in the path of movement of the limit plate 85. This would permit maximum movement of the key supporting block 24 and key blank 30 toward the cutting wheel 18 and therefore produce the deepest cut into the key blank 30. The actual depth of the cut is determined by the radial distance of the deepest stop surface 84f from the center of depth wheel 73, and since this depth will vary for different makes of locks, different sets of stepped stop surfaces are provided on the master depth wheel 73 to account for those variations.

As the worm gear 43 completes substantially a full revolution, the cam projection 47 again contacts the cam follower lever 48, which shifts the yoke 50 and key supporting block 24 to the right as viewed in FIGURE 7 and away from the cutting wheel 18, during which movement the yoke arm 52 actuates the pawl 66 to rotate the ratchet sector 64, the hub 60, and the spacer wheel 56 to shift the next inwardly spaced stop surface 58 of the stepping wheel lobe 57 into alignment with the shoulder member 59 and permit the carriage 21 to be shifted longitudinally by the springs 34, 35 to the second notch cutting position. Such movement of the ratchet sector 64 and hub 60 also shifted the link 121 to advance the coding lever 93 along the shaft 94 to the second selector disk position. This, of course, is so timed that it occurs when the pin 99 has again reached the lever 96 to rotate the collar 89 and pin 90 to the right from the position shown in FIGURE 5 so that the nose 101 of the coding lever 93 is withdrawn from the selector drum housing 103 at the time the coding lever 93 is advanced axially of the shaft 94 to the second selector disk position. This rocking action of the collar 89 and clutch member 78 will have also rotated the master depth wheel 73 from the position shown in FIGURE 7 through an arc extending counter-clockwise about the shaft 74 to a position wherein the outermost stop surface 84 is above the plane of the limit plate 85. If, then, the second selector disk 106 had been adjusted to the number one code position, the return stroke of the coding lever 93 toward the drum housing 103 will be so limited by the corresponding gaging surface 107 that the clockwise return movement of the master depth wheel 73 will only bring the stop surface 84a into the path of the limit plate 85. This would so restrict approaching movement of the key supporting block 24 toward the cutting wheel 18 as to produce only a minimum depth cut in the key blank 30. It is believed that the remainder of the cycle of operation of the machine to automatically step the carriage 21 longitudinally of the base 11 and to reciprocate the block 24 transversely of the base to effect cutting of the notches at the other key positions will be apparent from the foregoing description so that further description of this operation is unnecessary. When the carriage 21 reaches the end-of-travel position wherein the shoulder member 59 abuts the innermost stop surface 58 of the spacer wheel 56, the collar 119 also contacts the stop arm 117 to rotate the shaft 116 and decouple the clutch member 40 from the pulley 39, and the pin 126 engages the switch 124 to deenergize the electric motor. The carriage 121 is then shifted manually to the right as viewed in FIGURE 3 to the start position wherein the lock lever 121 engages the groove 120 in the carriage guide rod 22 and restrains the carriage 21 in the start position.

While but one preferred embodiment of the invention has been particularly shown and described, it is apparent that other modifications may be made in the invention without departing from the spirit and scope thereof, and it is desired, therefore, that only such limitations shall be placed thereon as are imposed by the prior art and are set forth in the appended claims.

What is claimed is:

1. A machine for cutting keys according to a code designating depths of cut to be made at a plurality of successive cutting stations spaced longitudinally along the bit of a key blank comprising a base, a rotary cutter mounted on the base for rotation about a stationary horizontal axis, a carriage mounted on said base for rectilinear movement along a longitudinal axis parallel to the axis of said cutter, a key carrier mounted on said carriage for movement along a transverse axis perpendicular to said cutter axis having key clamping means for supporting a key blank to be notched by said cutter, means for advancing said carriage intermittently along said longitudinal axis to successively position the cutting stations along the key bit in transverse alignment with the cutter, depth control means adjustable to a plurality of positions for adjustably gaging the depth of cut to be made in the key blank by the cutter, selector means for presetting before a cutting operation commences the entire set of depth control adjustments for said depth control means for all of the cutting stations of a complete key bit, and means responsive to the settings of the selector means for automatically shifting the depth control means successively to the depth adjustments corresponding to said settings in timed relation to intermittent advancement of the carriage.

2. A machine for cutting keys according to a code designating depths of cut to be made at a plurality of successive cutting stations spaced longitudinally along the bit of a key blank comprising a base, a rotary cutter mounted on the base for rotation about a stationary horizontal axis, a carriage mounted on said base for rectilinear movement along a longitudinal axis parallel to the axis of said cutter, a key carrier mounted on said carriage for movement along a transverse axis perpendicular to said cutter axis having key clamping means for supporting a key blank to be shifted into contact with the cutter by movement of said key carrier to notch the key blank, means for advancing said carriage intermittently along said longitudinal axis including spacer control means for adjustably gaging the movement of said carriage to interrupt movement of the carriage at positions to successively dispose the cutting stations in transverse alignment with the cutter, depth control means shiftable to a plurality of positions for adjustably gaging the depth of cut to be made in the key blank by the cutter, selector means having a plurality of adjustable members presettable before a cutting operation commences to set up the entire program of depth adjustments for the depth control means for all of the cutting stations of a complete key bit, and means responsive to the selector means settings for automatically positioning the depth control means to successive depth adjustments for a complete key bit in accordance with the complete program of selector means settings in timed relation to intermittent advancement of the carriage.

3. A machine for cutting keys according to a code designating depths of cut to be made at a plurality of successive cutting stations spaced longitudinally along the bit of a key blank comprising a base, a rotary cutter mounted on the base for rotation about a stationary horizontal axis, a carriage mounted on said base for rectilinear movement along a longitudinal axis parallel to the axis of said cutter having a shoulder thereon, a key carrier mounted on said carriage for movement along a transverse axis perpendicular to said cutter axis having abutment means and key clamping means for supporting a key blank in a position to be engaged and notched by said cutter upon movement of the carriage toward the cutter, means for continuously urging said carriage along said longitudinal axis, a stepping wheel having a stepped series of stop surfaces progressing inwardly from the periphery thereof positioned to be disposed in the path of movement of said carriage shoulder to intercept advancement of said carriage along said longitudinal axis at positions disposing the cutting stations along the key bit in transverse alignment with the cutter, means for intermittently shifting said stepping wheel to present successive inwardly spaced stop surfaces thereof to said shoulder whereby the carriage will be intermittently advanced to successively shift said cutting stations into alignment with the cutter, depth control means shiftable to a plurality of positions for adjustably gaging the depth of cut to be made in the key blank by the cutter, selector means having a plurality of adjustable members and adjusting tabs therefor corresponding to the number of cutting stations in a complete key bit to be preset before a key cutting operation commences to selected positions signifying the entire set of depth adjustments for all of the cutting stations for the complete key bit, and means responsive to the settings of the adjustable members for automatically positioning the depth control means to successive depth adjustment for the complete key bit signified by said settings in timed relation to intermittent advancement of the carriage.

4. A machine for cutting keys according to a code designating depths of cut to be made at a plurality of successive cutting stations spaced longitudinally along the bit of a key blank comprising a base, a rotary cutter mounted on the base for rotation about a stationary horizontal axis, a carriage mounted on said base for rectilinear movement along a longitudinal axis parallel to the axis of said cutter having a shoulder thereon, a key carrier mounted on said carriage for movement along a transverse axis perpendicular to said cutter axis having abutment means and key clamping means for supporting a key blank in a position to be engaged and notched by said cutter upon movement of the carriage toward the cutter, means for advancing said carriage intermittently along said longitudinal axis to successively disposed said plurality of cutting stations in transverse alignment with the cutter, a depth gage wheel having a stepped series of stop surfaces progressing inwardly from the periphery thereof for engagement with said abutment means to limit approach of said key carrier toward said cutter and regulate the depth of cut produced in the key bit, selector means including a plurality of setting disks each associated with one of said cutting stations for setting up a program of successive adjustments for said depth gaging wheel for the plurality of cutting positions along the key bit, a sensing member for sensing the setting of said selector means for each cutting station, means for intermittently shifting said sensing member successively to each setting disk in accordance with advancement of the carriage to the successive cutting stations to sense the setting of each setting disk for its associated cutting station, and means responsive to the sensing member for positioning the stepping wheel in accordance with the setting sensed by the sensing member to position a selected stop surface on said gaging wheel to be engaged by said abutment means on said key carrier and regulate the depth of cut in accordance with the setting disk settings.

5. A machine for cutting keys according to a code designating depths of cut to be made at a plurality of successive cutting stations spaced longitudinally along the bit of a key blank comprising a base, a rotary cutter mounted on the base for rotation about a stationary horizontal axis, a carriage mounted on said base for rectilinear movement along a longitudinal axis parallel to the axis of said cutter having a shoulder thereon, a key carrier mounted on said carriage for movement along a transverse axis perpendicular to said cutter axis having abutment means and key clamping means for supporting a key blank in a position to be engaged and notched by said cutter upon movement of the carriage toward the cutter, means for continuously urging said carriage along said longitudinal axis, a stepping wheel having a stepped series of stop surfaces progressing inwardly from the periphery thereof positioned to be disposed in the path of movement of said carriage shoulder to intercept advancement of said carriage along said longitudinal axis at positions disposing the cutting stations along the key bit in transverse alignment with the cutter, means for intermittently shifting said stepping wheel to present successive inwardly spaced stop surfaces thereof to said shoulder whereby the carriage will be intermittently advanced to successively shift said cutting stations into alignment with the cutter, a depth gage wheel having a stepped series of stop surfaces progressing inwardly from the periphery thereof for engagement with said abutment means to limit approach of said key carrier toward said cutter and regulate the depth of cut produced in the key bit, selector means including a plurality of setting disks each associated with one of said cutting stations for setting up a program of successive adjustments for said depth gaging wheel for the plurality of cutting positions along the key bit, a sensing member for sensing the setting of said selector means for each cutting station, means for intermittently shifting said sensing member successively to each setting disk in accordance with advancement of the carriage to the successive cutting stations to sense the setting of each setting disk for its associated cutting station, and means responsive to the sensing member for positioning the stepping wheel in accordance with the setting sensed by the sensing member to position a selected stop surface on said gaging wheel to be engaged by said abutment means on said key carrier and regulate the depth of cut in accordance with the setting disk settings.

6. A machine for cutting keys according to a code designating depths of cut to be made at a plurality of successive cutting stations spaced longitudinally along the bit of a key blank comprising a base, a rotary cutter mounted on the base for rotation about a stationary horizontal axis, a carriage mounted on said base for rectilinear movement along a longitudinal axis parallel to the axis of said cutter having a shoulder thereon, a key carrier mounted on said carriage for movement along a transverse axis perpendicular to said cutter axis having abutment means and key clamping means for supporting a key blank in a position to be engaged and notched by said cutter upon movement of the carriage toward the cutter, means for advancing said carriage intermittently along said longitudinal axis to successively dispose said plurality of cutting stations in transverse alignment with the cutter, cam means for reciprocating said key carrier toward said cutter, a depth gage wheel having a stepped series of stop surfaces progressing inwardly from the periphery thereof for engagement with said abutment means to limit approach of said key carrier toward said cutter and regulate the depth of cut produced in the key bit, selector means including a plurality of setting disks spaced along a disk axis and each associated with one of said cutting stations for setting up a program of successive adjustments for said depth gage wheel for the plurality of cutting positions along the key bit, a pivoted sensing lever supported for movement along an axis parallel to said disk axis, means for arcuately reciprocating the sensing lever about said sensing lever axis away from said setting disks and returning the same toward said setting disks when the key carrier is withdrawn from said cutter, means for rotating said depth gage wheel in correspondence with rotation of said sensing lever, said setting disks having a plurality of gaging surfaces thereon and being adjustable to dispose the gaging surfaces to limit the position to which the sensing lever returns and thereby establish the position of adjustment of said depth gaging wheel, and means for shifting said sensing lever along the series of setting disks to a position of lateral alignment with the next successive disk while the sensing lever is withdrawn from the setting disks.

7. A code key cutting machine according to claim 6, said depth gaging wheel having a plurality of zones each comprising a set of stop shoulders for engaging the depth of cut for a selected type of lock, and means for manually adjusting the zone of said depth gaging wheel which is positioned to coact with said abutment means to establish depths of cut including clutch means for decoupling said depth gaging wheel from said means for reciprocating said sensing lever to permit manual adjustment of the depth gaging wheel independently of the sensing lever.

8. A code key cutting machine according to claim 3, wherein said stepping wheel includes a plurality of lobes selectively positionable to coact with said shoulder member, each of said lobes including a set of stop surfaces for a selected type of lock wherein the stop surfaces progress inwardly from the outer periphery of the associated lobe, pawl and ratchet means responsive to each withdrawal of the key carrier from the cutter to advance said stepping wheel through one increment of rotation to position the next successive radially inwardly spaced stop shoulder to abut said shoulder means to position said carriage along said longitudinal axis.

9. The combination recited in claim 2, wherein said selector means includes a drum-shaped housing, a plurality of adjustable coaxial setting disks spaced along the central axis of said drum and corresponding in number to the number of said cutting stations, said setting disks each having a stepped series of gaging surfaces progressing inwardly from the periphery of the disk, an arcuative reciprocative sensing lever disposed externally of the drum housing and supported for movement alongside said housing into transverse alignment with each of said disks, said sensing lever having a nose periodically projectable into said housing, and means for adjusting said setting disks independently of each other including a setting tab projecting to an exposed position externally of said drum housing to dispose selected gaging surfaces on said disks at positions to be abutted by said sensing lever nose upon projection of the sensing lever nose into said drum housing.

References Cited in the file of this patent
UNITED STATES PATENTS

| | | |
|---|---|---|
| 1,923,164 | Roos | Aug. 22, 1933 |
| 1,948,260 | Fowler | Feb. 20, 1934 |
| 2,114,597 | Goddard | Apr. 19, 1938 |